June 13, 1939.　　U. C. DUNAWAY ET AL　　2,162,069
APPARATUS FOR IMPARTING PULL TO ELECTRICAL CONDUCTORS
Filed March 21, 1938　　4 Sheets-Sheet 1

INVENTORS
ULRICH C. DUNAWAY
and FIRMIN M. CUNNINGHAM
By E. M. Harrington
ATTORNEY

June 13, 1939.  U. C. DUNAWAY ET AL  2,162,069
APPARATUS FOR IMPARTING PULL TO ELECTRICAL CONDUCTORS
Filed March 21, 1938  4 Sheets-Sheet 3

INVENTORS
ULRICH C. DUNAWAY
and FIRMIN M. CUNNINGHAM
BY
ATTORNEY

INVENTORS
ULRICH C. DUNAWAY
and FIRMIN M. CUNNINGHAM
BY
ATTORNEY

Patented June 13, 1939

2,162,069

UNITED STATES PATENT OFFICE 2,162,069

APPARATUS FOR IMPARTING PULL TO ELECTRICAL CONDUCTORS

Ulrich C. Dunaway, St. Louis, and Firmin M. Cunningham, Maplewood, Mo., assignors to James R. Kearney Corporation, St. Louis, Mo., a corporation of Missouri Application March 21, 1938, Serial No. 197,096

18 Claims. (Cl. 254—77)

This invention relates generally to an improved apparatus adapted for use in replacing insulators, clamps and other appurtenances forming parts of dead end and other assemblies employed in certain situations where electrical conductors are attached to poles or other supports, the predominant object of the invention being to provide an apparatus of this type which is of such improved construction and arrangement and is capable of such use that the task of replacing insulators or other parts of such assemblies is very greatly simplified and is rendered much less dangerous than heretofore when apparatus of the type formerly used were employed.

Line anchoring assemblies of the type with which the improved apparatus disclosed herein may be used ordinarily comprise one or more strings of insulators, the insulators of each string being movably and removably connected together, and each string of insulators being connected at its opposite ends by suitable means to a pole or other support and to an associated electrical conductor. It frequently happens because of breakage or for other reasons that it becomes necessary to replace insulators or other parts of an anchoring assembly and therefore provision must be made for temporarily attaching the electrical conductor to the pole or other support while the assembly is being disassembled in accomplishing the replacement of parts thereof. Also the means employed for temporarily attaching the electrical conductor to the pole or other support must be of such nature that the tension ordinarily present in dead end assemblies because of the attachment of electrical conductors thereto may be relieved so that the assemblies may be disassembled for the purpose of replacing parts thereof.

The improved apparatus disclosed herein is of such improved construction and arrangement that the task of arranging it in place in assembled relation with respect to a pole, or other support, and an associated electrical conductor is relatively simple and may be accomplished with maximum safety to the linemen performing the task, and also the improved apparatus includes means capable of simple and convenient operation for puting slack in the assembly with which it is associated so that said assembly may be disassembled to the extent necessary to replace parts thereof.

Figures 3, 4, 5, 6, 8, 9:
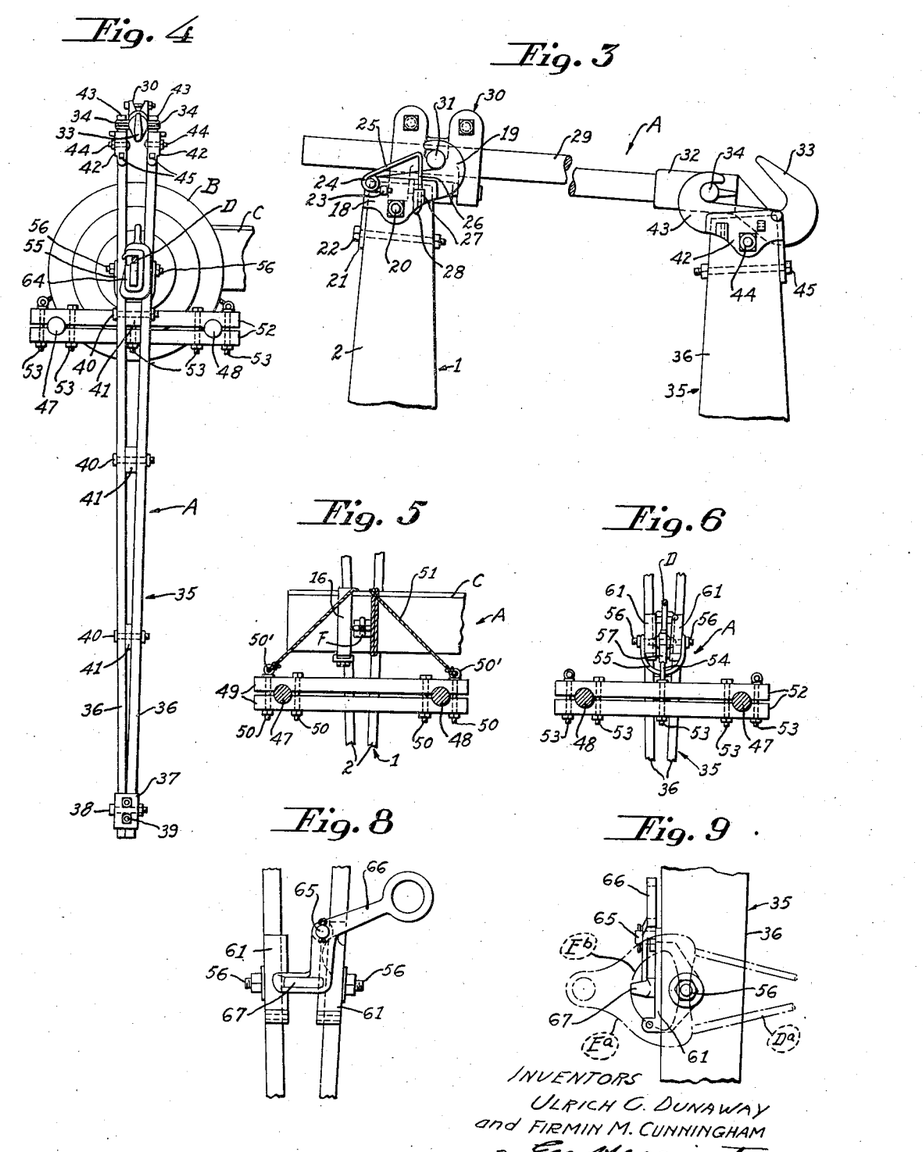
Fig. 3 is a fragmentary side elevation illustrating the upper portion of the apparatus.
Fig. 4 is an end elevation of the apparatus as illustrated in Fig. 1.
Fig. 5 is a fragmentary section taken on line 5—5 of Fig. 1.
Fig. 6 is a fragmentary section taken on line 6—6 of Fig. 1.
Fig. 8 is a modified form of the means forming a part of the apparatus for engaging a clamp of an anchoring assembly which is different from the clamp of the assembly illustrated in Fig. 1.
Fig. 9 is a side elevation of the structure illustrated in Fig. 8 with a clamp and a portion of the associated electrical conductor shown by dot and dash lines.
Figure 7:
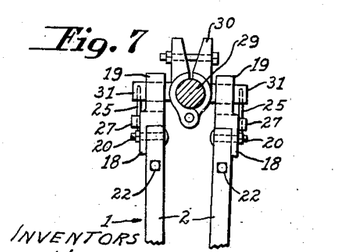
Fig. 7 is a fragmentary section taken on line 7—7 of Fig. 1.

In the drawings, wherein are shown for the purpose of illustration, merely, several embodiments of the invention, A designates the apparatus of the invention generally. The apparatus A includes a member 1 which, as shown in Fig. 4, is made up of a pair of bars 2 that are secured together adjacent to their lower ends by a member 3. The member 3 comprises a substantially U-shaped element which is arranged in embracing relation with respect to portions of the bars 2, a bolt 4 being extended through alined openings formed in opposed portions of said U-shaped element and in said bars for securing the element to the bars. The member 3 includes also a U-shaped bolt 5 which is secured by nuts to the U-shaped element of said member, the legs of said U-shaped bolt being extended between the bars 2 and the bridge end of the U-shaped bolt being extended from the member 1 as shown to the best advantage in Fig. 1. Preferably the bars 2 are formed of wood or other suitable electrical insulating material, and said bars are secured together upwardly of their lower ends by a plurality of bolts, two of these bolts being designated by the reference characters 6 and 7 (Figs. 1 and 4) and being extended through alined apertures formed in the bars and in spacers 8 located between said bars.

In use of the improved apparatus the member 1 is secured to a support and for the purpose of this disclosure a crossarm C is illustrated in the drawings as such support. The means for attaching the member 1 to the crossarm C is shown to the best advantage in Figs. 1 and 2, said means including an element 9 which is disposed between the bars 2 of the member 1 with a bolt 10 extended through alined openings formed in the bars and in said element for securing the element in place. The element 9 is provided with a socket 12 that receives a ball 13 formed on a member 14 which is attached to the crossarm C, said member 14 being provided with pointed portions 14' adapted to be embedded in the material of the crossarms so as to assist in obtaining secure attachment of the member 14 to the crossarm. The member 14 has an opening 15 formed therethrough and extended through this opening is a strap 16 which is arranged about the crossarm C, said strap being provided with a suitable buckle 17 whereby the strap may be tightly secured about the crossarm as shown in Figs. 1 and 2 to movably attach the member 1 to the crossarm through cooperation of the member 14 and the element 9.

Figure 1:
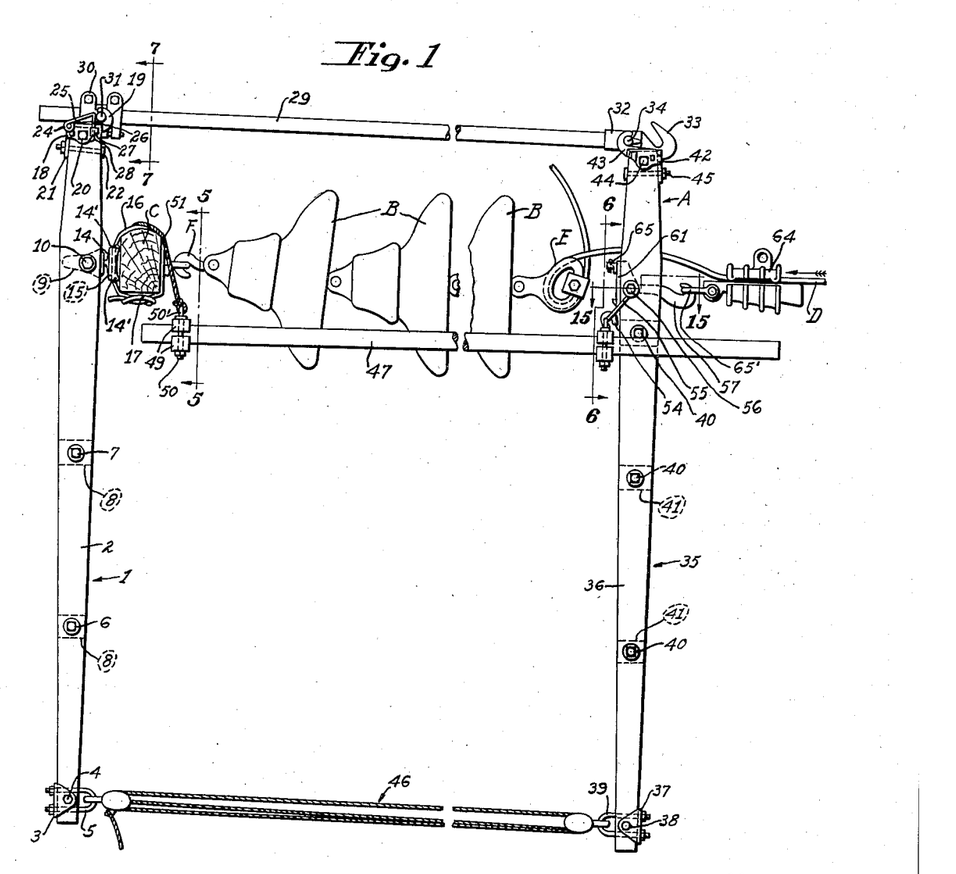
Fig. 1 is a side elevation of the improved apparatus showing same in association with a crossarm (shown in section) of a pole (not shown) to which an electrical conductor is normally attached by means of an anchoring assembly.
Figure 2:
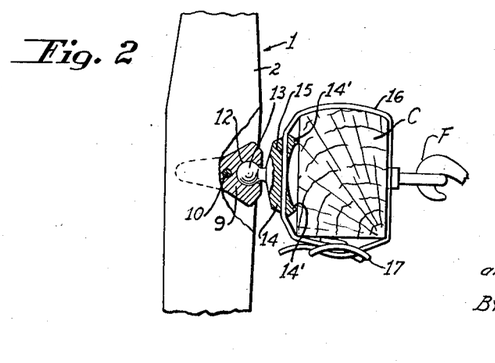
Fig. 2 is an enlarged fragmentary view, partly in elevation and partly in section, showing the manner of attaching the improved apparatus to a crossarm of a pole.

At the upper end of the member 1 each bar 2 thereof has a member 18 fixed thereto which includes an integrally formed hook-shaped portion 19 (Figs. 1 and 3). Each of the members 18 embraces the upper end portion of the associated bar 2 and each member 18 is fixed to the associated bar through the instrumentality of a bolt 20 which passes through alined openings formed in portions of the member and bar. Also each member 18 includes an extension 21 which contacts with an edge of the associated bar 2, and a bolt 22 extends through alined apertures formed in said extension and said bar to assist in the secure attachment of the member to the bar. Additionally the member 18 associated with each bar 2 includes as a part thereof a spring catch which serves a purpose to be hereinafter set forth. The spring catch of each member 18 comprises a length of relatively heavy wire which is anchored to a lug 23 formed on the associated member 18. Adjacent to its lug 23 each spring catch is provided with a coiled portion 24 that imparts resiliency to the catch, and inclined upwardly and forwardly from this coiled portion is portion 25 which terminates at its forward end in a downwardly extended portion 26. The downwardly extended portion 26 of each spring catch passes through an opening formed in a lug 27 formed on the associated member 18, and preferably the lower end portion of the downwardly extended portion 26 of each spring catch is bent as indicated at 28 in Fig. 3 so as to limit upward movement of said portion 26 relative to the lug 27 through which it extends.

Arranged at the top of the improved apparatus A is a bar 29 which preferably is formed of wood or other suitable electrical insulating material. The bar 29 has clamped, or otherwise secured thereto, an element 30 which is provided adjacent to its opposite ends with trunnions 31 extended outwardly from its opposite sides. As shown in Figs. 1 and 3 the opposed trunnions 31 are engaged by the hook-shaped portions 19 of the members 18 at the upper ends of the bars 2 of the member 1 so as to connect said bar 29 to said member 1. When the trunnions 31 are to be arranged in engaging relation with the hook shaped portions 19 of the members 18 said trunnions are drawn forwardly of the upper ends of the bars 2 of the member 1 in contact with the portions 25 of the spring catches. Such movement of the trunnions will cam the spring catches downwardly permitting the trunnions to pass into the pockets of the hook-shaped portions 19 of the members 18, and when the trunnions have moved forwardly of the spring catches said spring catches move upwardly to the position shown in Figs. 1 and 3 in which position they prevent accidental displacement of the trunnions from the pockets of the hook-shaped portions 19.

At the forward end of the bar 29 a sleeve member 32 is fixedly mounted thereon, said sleeve member 32 being provided at its forward end with a hook 33. The sleeve member 32 has extended outwardly from opposite sides thereof trunnions 34. The trunnions 34 serve as means for connecting to the forward portion of the bar 29 a member 35 which closely resembles the member 1 heretofore described herein. The member 35, like the member 1, is composed of a pair of bars 36 which are secured together at their lower ends by a member 37 and its associated bolt 38, and said member 37 has associated with it a U-bolt 39. Also upwardly of the lower end of the member 35 the bars 36 thereof are secured together by bolts 40 which pass through alined openings formed in the bars and in spacers 41 disposed between said bars. Additionally, as in the case of the member 1, the bars 36 of the member 35 have members 42 secured at their upper ends which include hook-shaped portions 43, said members 42 being arranged in embracing relation with respect to the upper end portions of the bars and being secured to said bars by bolts 44 and 45. The hook-shaped portions 43 of the members 42 at the upper ends of the bars 36 of the member 35 engage the trunnions 34 of the member 32 fixed to the bar 29 at its forward end as shown clearly in Figs. 1 and 3. The lower ends of the members 1 and 35 are connected together by means of a block and tackle assembly 46 (Fig. 1) said assembly being attached to the U-bolts 5 and 39 of the members 3 and 37 associated with the lower ends of said members 1 and 35.

Figure 15:
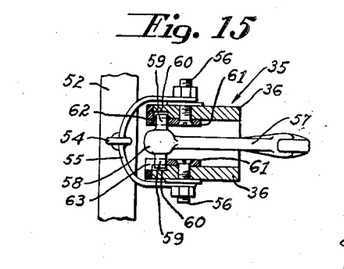
Fig. 15 is a horizontal section taken on line 15—15 of Fig. 1.

The improved apparatus disclosed herein includes a pair of elongated bars 47 and 48 which are connected together adjacent to their rear ends by a pair of associated elements 49. The elements 49 are caused to clampingly engage the bars 47 and 48, as shown in Fig. 5, by bolts 50, the outermost of said bolts being provided with eyes 50'. The bars 47 and 48 are supported at the rear ends by a flexible element 51, such, for instance, as a rope, which is turned several times about the crossarm C and has its opposite ends tied through the eyes 50' of the outermost bolts 59 associated with the pair of elements 49. At a point located inwardly of the forward end of the bars 47 and 48 said bars are connected together by a pair of associated elements 52 (Fig. 6) which are drawn into clamping engagement with said bars by bolts 53. The center bolt of the bolts 53 is provided at its upper end with a hook 54, said hook being engaged by a bail 55 which is pivotally attached to the member 35 by suitable fastening devices 56 (see Fig. 15). The bars 47 and 48, when supported by the rope 51 and the bail 55 as described, are disposed immediately beneath the string of insulators B, as shown in Fig. 4, said bars being spaced so that they provide a cradle structure which supports the insulators when slack is produced in the dead end assembly of which the insulators form parts.

Associated with the member 35 is a hook 57 whose hooked end extends forwardly of said member 35 as shown in Fig. 1. The shank of the hook 57 is disposed between the bars 36 of the member 35 (see Fig. 15) and at the rear end of said shank portion an enlarged portion 58 is formed from which trunnions 59 extend outwardly in opposite directions. The inner faces of the bars 36 of the member 35 are cut away as indicated at 60 in Fig. 15, and L-shaped plates 61 are secured to said bars in contact with the inner faces and the rear edge faces of the bars 36, the L-shaped plates being secured to the bars by the fastening elements 56 previously mentioned herein. The L-shaped plate 61 associated with one of the bars 36 of the member 35 is provided with a circular opening 62 which serves as a bearing for one of the trunnions 59 of the hook 57. The L-shaped plate 61 associated with the other bar 36 of the member 35, however, is provided with a horizontal, elongated opening 63 that serves as a bearing for the other trunnion of the hook and which elongated opening is open at the rear face of that L-shaped plate. To assemble the hook 57 with the member 35 the rear portion of the hook is arranged between the bars 36 of said member 35 in a canted position. One trunnion of the hook may then be introduced into the circular opening 62 of the L-shaped plate associated with one of the bars 36 after which the hook may be moved to cause the other trunnion of the hook to enter the elongated, open end opening in the L-shaped plate associated with the other bar 36.

When the improved apparatus is to be used it is mounted on the crossarm in its assembled condition as described and as illustrated in Fig. 1. A suitable wire clamp 64 is attached to the conductor D which is associated with the anchoring assembly to be worked upon, this anchoring assembly including the insulators, B previously mentioned herein, and a clamp E which serves to attach the conductor D to the string of insulators, and the string of insulators being attached to the crossarm C by suitable means such as the hook and eye connection F shown in Fig. 1. The wire clamp 64 which is attached to the conductor D may be of various types such, for instance, as the wedge type clamp shown in Fig. 1 whose bail 65' is caused to engage the hook 57. With the apparatus so arranged the block and tackle assembly 46 is operated to draw the lower ends of the members 1 and 35 toward each other with the result that the conductor is drawn in the direction indicated by the arrow at the right hand side of Fig. 1. This will put slack in the anchoring assembly which will permit removal and replacement, if desired, of insulators B or of the clamp E, or of other parts of the assembly. When slack has been put in the anchoring assembly as described the bars 47 and 48 provide a cradle which supports the insulators B and thereby facilitates the task of doing work in connection with the assembly.

Various anchoring assemblies with which the improved apparatus disclosed herein is employed are provided with clamps of types different from the clamp E shown in Fig. 1, and therefore the L-shaped plates 61 heretofore described are so constructed and arranged that they may receive clamp engaging means of different descriptions. By referring to Figs. 8 and 9 it will be noted that one of the L-shaped plates is provided with a fixed pivot pin 65 on which an angular arm 66 is mounted for swinging movement when the anchoring assembly includes a clamp Ea of the type illustrated by dot and dash lines in Fig. 9. The angular arm 66 includes a clamp engaging portion 67 which, as shown in Fig. 9, is swingable into the opening Eb of the clamp so that a wall of said opening contacts with a face of the portion 67 of the angular arm 66. A portion of the clamp Ea and a portion of the conductor Da connected thereto extend between the bars of the member 35 and when the lower end of said member 35 is drawn toward the lower end of the member 1 as already explained herein slack will be put in the anchoring assembly of which the clamp Ea forms a part.

Figures 10, 11, 12, 13, 14:
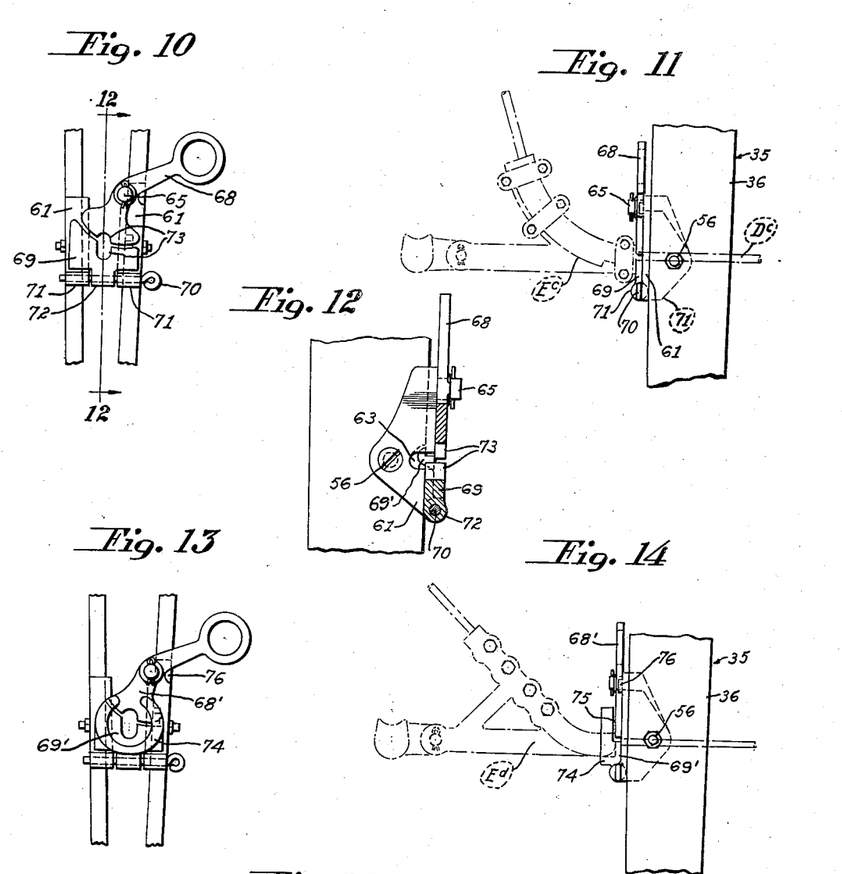
Fig. 10 is a front elevation of another form of means forming a part of the apparatus for engaging still another form of clamp of an anchoring assembly.
Fig. 11 is a side elevation of the structure illustrated in Fig. 10, showing the clamp and a portion of the associated electrical conductor by dot and dash lines.
Fig. 12 is a vertical section taken on line 12—12 of Fig. 10.
Fig. 13 is a front elevation of still another form of means forming a part of the apparatus for engaging still another type of clamp of an anchoring assembly.
Fig. 14 is a side elevation of the sthructure illustrated in Fig. 13 showing the clamp and a portion of the associated electrical conductor by dot and dash lines.

When a clamp Ec of the type illustrated in Fig. 11 is a part of an anchoring assembly with which the improved apparatus is employed an arm 68 such as that illustrated in Figs. 10, 11, and 12 is mounted for swinging movement on the fixed pivot 65. Also when the arm 68 is employed a lower element 69 is secured to the L-shaped plates 61, and to attach said lower element 69 to the L-shaped plates a pin 70 is passed through opposed eye portions 71 formed on the L-shaped plates at the lower ends thereof and through an eye portion 72 formed on the lower element 69 which is disposed between the eye portions of the L-shaped plates. Also the lower element 69 is provided with a lug 69' (Fig. 12) which extends into the opening 63 and engages an edge portion of the plate 61 located adjacent to said opening to assist in holding said lower element 69 in its normal position. The arm 68 and the lower element 69 are provided with cooperating notches 73 which receive the conductor Dc, the arm 68 being swung on the pivot 65 to permit the arm 35 to be so positioned relative to the conductor Dc that said conductor will extend through the cooperating notches 73 of the lower element 69 and the arm 68 when said arm 68 is restored to normal position. When the apparatus is ready for use the end of the clamp Ec contacts with portions of the lower element 69 and arm 68 and when the lower end of the member 35 is moved toward the lower end of the member 1 slack will be put in the associated anchoring assembly.

When a clamp Ed of the type illustrated in Fig. 14 forms a part of the anchoring assembly with which the apparatus is to be employed, clamp engaging elements which are shown in Figs. 13 and 14 and which are quite similar to those shown in Figs. 10, 11, and 12 are used. The clamp engaging means of Figs. 13 and 14 differ from those of Figs. 10, 11, and 12 in that the lower element 69' is provided with an arcuate marginal flange 74 which embraces the end portion of the clamp E*d* that contacts with said lower element and with the arm 68'. By referring to Fig. 14 it will be noted that the arcuate marginal flange 74 is cut away as indicated at 75 so that portions of the arm 68' may swing behind portions of said arcuate marginal flange. It is to be noted that a stop 76 is provided to limit movement in one direction of the arm 68'. This is true also of the structures shown in Figs. 8 and 9 and in Figs. 10, 11, and 12 wherein such a stop for limiting movement of the arms is present.

Figures 16, 18:
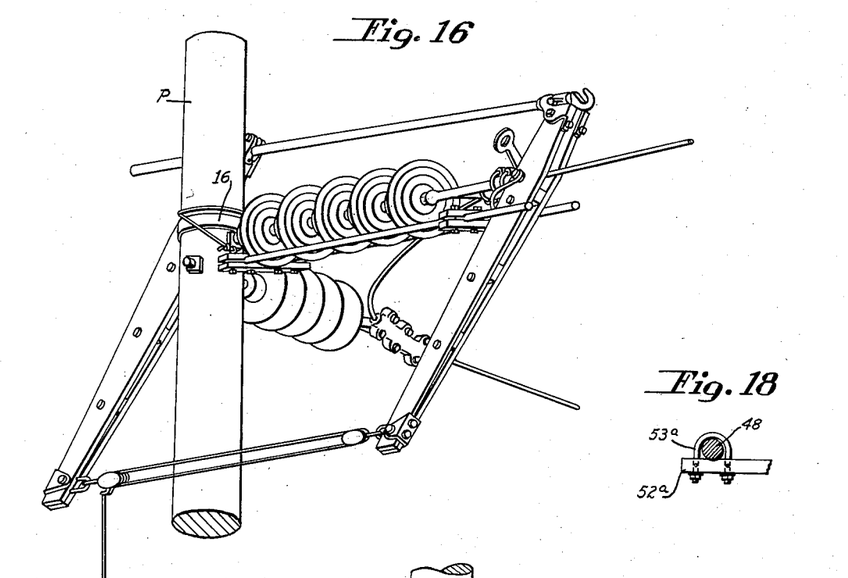
Fig. 16 illustrates a different manner of using the improved apparatus.
Fig. 18 is a modified form of a part of the apparatus.

Instead of attaching the apparatus to a crossarm as shown in Figs. 1 and 2, the apparatus may be attached directly to a pole P as shown in Fig. 16. When the apparatus is so mounted on a pole the member 14 is secured to the pole by securing the strap 16 about the pole and the substantially rectangular structure produced by the apparatus is arranged in embracing relation with respect to the pole as shown in Fig. 16. When the apparatus is employed as shown in Fig. 16 it is operated as already explained herein.

Figure 17:
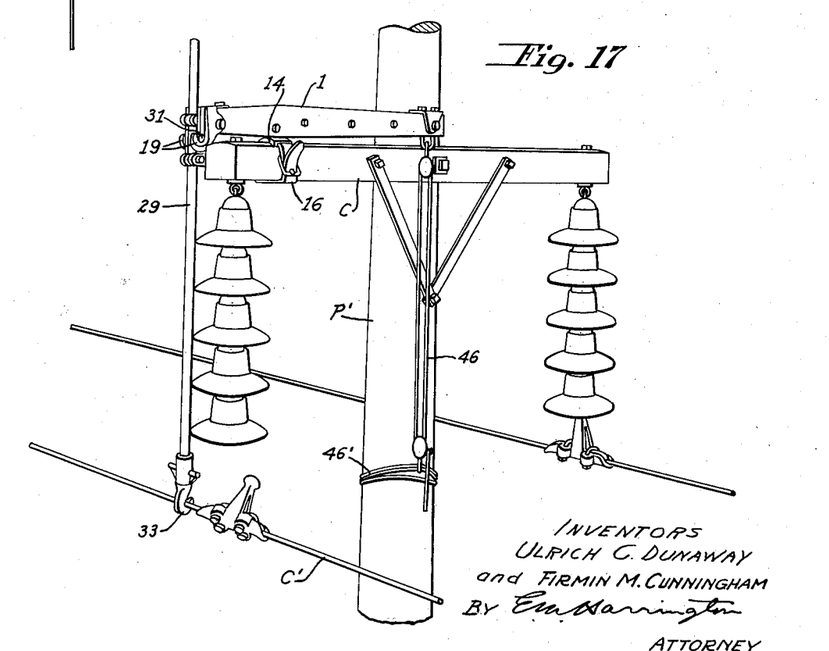
Fig. 17 illustrates still another manner of using the improved apparatus.

Also a portion of the apparatus may be employed to put slack in an anchoring assembly of the suspension type as illustrated in Fig. 17. In accordance with this arrangement the element 1 is secured by means of the strap 16 to a crossarm C with the member 14 contacting with the top face of said crossarm. The bar 29, which is connected to the member 1 with the aid of the hooks 19 and the trunnions 31, extends vertically and the hook 33 of said bar engages the conductor C'. The opposite end of member 1 has attached thereto a block and tackle assembly 46 the opposite end of said block and tackle assembly being secured to the pole P' by a rope 46' or otherwise. When the apparatus as illustrated in Fig. 17 is operated the block and tackle assembly raises the end of the member 1 to which the bar 29 is attached thus elevating said bar and putting slack in the insulator assembly.

Instead of employing a pair of elements 52 for connecting together the bars 47 and 48 as shown in Fig. 6, only one of such elements 52a may be used as shown in Fig. 18. In accordance with this arrangement the bars 47 and 48 may be each retained in engaged relation with respect to the single element 52a by a U-bolt 53a, whose bridge portion embraces the bar and the legs of which pass through openings formed in the element 52a. The U-bolts 53a have nuts mounted on screw-threaded portions of the legs thereof to secure the U-bolts to the element 52a.

We claim:

1. An apparatus for imposing pull on an electrical line to put slack in an anchoring assembly associated therewith comprising, an element adapted for association with a support, securing means for attaching said element to the support, an elongated member, means for movably connecting said elongated member to said element, means connected to said member adjacent to one end thereof and adapted for engagement with the electrical line on which pull is to be imposed, and means including a flexible element connected to said elongated member adjacent to the opposite end thereof for moving said member so as to impose pull on the electrical line through cooperation with said member of the means connected thereto, said means for movably connecting said elongated member and said element being located between the points at which said electrical line engaging means and said elongated member moving means are connected to said elongated member.

2. An apparatus for imposing pull on an electrical line to put slack in an anchoring assembly associated therewith comprising, an element adapted for association with a support, securing means for attaching said element to the support, an elongated member, means for movably connecting said elongated member to said element, means connected to said member adjacent to one end thereof and adapted for engagement with the electrical line on which pull is to be imposed, and means comprising a block and tackle assembly connected to said elongated member adjacent to the opposite end thereof for moving said member so as to impose pull on the electrical line through cooperation with said member of the means connected thereto, said means for movably connecting said elongated member and said element being located between the points at which said electrical line engaging means and said elongated member moving means are connected to said elongated member.

3. An apparatus for imposing pull on an electrical line to put slack in an anchoring assembly associated therewith comprising, an element adapted for association with a support, securing means for attaching said element to the support, an elongated member, swivel means for movably connecting said elongated member to said element, means connected to said member adjacent to one end thereof and adapted for engagement with the electrical line on which pull is to be imposed, and means connected to said elongated member adjacent to the opposite end thereof for moving said member so as to impose pull on the electrical line through cooperation with said member of the means connected thereto, said swivel means for movably connecting said elongated member and said element being located between the points at which said electrical line engaging means and said elongated member moving means are connected to said elongated member.

4. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, and means connected to the first mentioned and second mentioned elongated members for moving relative to each other the ends of said elongated members remote from the ends thereof which are connected to opposite ends of said element.

5. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, and means including a flexible element connected to the first mentioned and second mentioned elongated members for moving relative to each other the ends of said elongated members remote from the ends thereof which are connected to opposite ends of said element.

6. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, and means comprising a block and tackle assembly connected to the first mentioned and second mentioned elongated members for moving relative to each other the ends of said elongated members remote from the ends thereof which are connected to opposite ends of said element.

7. An apparatus for imposing pull on an electrical line to put slack in an anchoring assembly associated therewith, comprising an anchoring element adapted for association with a support, securing means for attaching said anchoring element to the support, an elongated member, swivel means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, and means connected to the first mentioned and second mentioned elongated members for moving relative to each other the ends of said elongated members remote from the ends thereof which are connected to opposite ends of said element.

8. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, means connected to the first mentioned and second mentioned elongated members for moving relative to each other the ends of said elongated members remote from the ends thereof which are connected to opposite ends of said element, and a cradle structure for supporting portions of said anchoring assembly when slack has been imparted thereto.

9. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, means connected to the first mentioned and second mentioned elongated members for moving relative to each other the ends of said elongated members remote from the ends thereof which are connected to opposite ends of said element, and a cradle structure for supporting portions of said anchoring assembly when slack has been imparted thereto, said cradle structure comprising substantially parallel elongated elements provided with means adjacent to opposite ends thereof for supporting said cradle structure in place.

10. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, means connected to the first mentioned and second mentioned elongated members for moving relative to each other the ends of said elongated members remote from the ends thereof which are connected to opposite ends of said element, and a cradle structure for supporting portions of said anchoring assembly when slack has been imparted thereto, said cradle structure comprising substantially parallel elongated elements provided with means adjacent to opposite ends thereof for supporting said cradle structure in place, the securing means at one end of the cradle structure being attached to the second-mentioned elongated member and the securing means at the opposite end of the cradle structure being adapted for attachment to the support to which the anchoring element is adapted for attachment.

11. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, means connected to the first mentioned and second mentioned elongated members for moving relative to each other the ends of said elongated members remote from the ends thereof which are connected to opposite ends of said element, and a cradle structure for supporting portions of said anchoring assembly when slack has been imparted thereto, said cradle structure comprising substantially parallel elongated elements, cross members connecting said elongated elements adjacent to the opposite ends thereof, and means connected to said cross members for securing the cradle structure in place.

12. An apparatus for imposing pull on an electrical line to put slack in an anchoring assembly associated therewith, comprising an anchoring element adapted for association with a support, securing means for attaching said anchoring element to the support, an elongated member, means for movably connecting said elongated member to said anchoring element, a second elongated member, an element movably attached at its opposite ends to corresponding ends of the first mentioned and second mentioned elongated members, said second mentioned elongated member being arranged in engagement with the electrical line on which pull is to be imposed, means connected to the first mentioned and second mentioned elongated members for moving relative to each other the ends of said elongated members remote from the ends thereof which are connected to opposite ends of said element, and a cradle structure for supporting portions of said anchoring assembly when slack has been imparted thereto, said cradle structure comprising substantially parallel elongated elements, cross members connecting said elongated elements adjacent to the opposite ends thereof, and means connected to said cross members for securing the cradle structure in place, the means at one end of the cradle structure for securing it in place being a bail pivotally attached to the second-mentioned elongated member and arranged in engagement with a hook associated with the adjacent cross member, and the securing means at the opposite end of the cradle being a flexible element connected to the cross member at that end of the cradle and adapted for attachment to the support to which said anchoring element is adapted for attachment.

13. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, means secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite ends of said element.

14. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, removable means secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite sides of said element.

15. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, means pivotally secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite ends of said element.

16. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, the means for movably attaching said element to ends of said elongated members comprising cooperating hooks and trunnions, means secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite ends of said element.

17. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, the means for movably attaching said element to ends of said elongated members comprising hooks associated with said elongated members which engage trunnions associated with said element, means secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite ends of said element.

18. An apparatus for imposing pull on an electrical line to put slack in an anchoring assembly associated therewith, comprising an anchoring element adapted for association with a support, securing means for attaching said anchoring element to the support, an elongated element, means for movably connecting said elongated member to said anchoring element, a second elongated member, an element movably attached at its opposite ends to corresponding ends of the first-mentioned and second-mentioned elongated members, the means for movably attaching said element to ends of said elongated members comprising hooks associated with said elongated members which engage trunnions associated with said element, means for preventing unintended disengagement of a trunnion of said element from a hook of one of said elongated members, means secured to said second-mentioned elongated member for engaging an electrical line on which pull is to be imposed, and means connected to the first-mentioned and second-mentioned elongated members for moving relative to each other the ends of said elongated members remote from the ends thereof which are connected to opposite ends of said element.

ULRICH C. DUNAWAY.
FIRMIN M. CUNNINGHAM.